United States Patent
Yonezawa et al.

(10) Patent No.: US 11,825,858 B2
(45) Date of Patent: Nov. 28, 2023

(54) METHOD FOR MANUFACTURING TEA AROMA COMPOSITION

(71) Applicant: SUNTORY HOLDINGS LIMITED, Osaka (JP)

(72) Inventors: Daisaku Yonezawa, Kanagawa (JP); Makoto Otsuka, Kyoto (JP); Takashi Mukai, Kyoto (JP); Takeshi Nakajima, Kyoto (JP); Keita Kikuchi, Kyoto (JP); Yuji Hirayama, Kanagawa (JP); Taisuke Osanai, Kanagawa (JP); Taishu Hamaba, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 116 days.

(21) Appl. No.: 17/599,221

(22) PCT Filed: Mar. 27, 2020

(86) PCT No.: PCT/JP2020/013896
§ 371 (c)(1),
(2) Date: Sep. 28, 2021

(87) PCT Pub. No.: WO2020/203720
PCT Pub. Date: Oct. 8, 2020

(65) Prior Publication Data
US 2022/0174974 A1 Jun. 9, 2022

(30) Foreign Application Priority Data
Mar. 29, 2019 (JP) .................................. 2019-068516

(51) Int. Cl.
*A23F 3/42* (2006.01)

(52) U.S. Cl.
CPC ...................................... *A23F 3/42* (2013.01)

(58) Field of Classification Search
CPC ......................................................... A23F 3/42
See application file for complete search history.

(56) References Cited

U.S. PATENT DOCUMENTS

| 2003/0152601 | A1* | 8/2003 | Kanayama | A61Q 17/00 424/401 |
| 2009/0029003 | A1 | 1/2009 | Bagaria et al. | |
| 2009/0169692 | A1* | 7/2009 | Israni | A23F 3/40 426/387 |

FOREIGN PATENT DOCUMENTS

| CN | 104957315 | * 10/2015 |
| CN | 105558157 A | 5/2016 |
| CN | 107361398 A | 11/2017 |
| CN | 107927282 A | 4/2018 |
| JP | 2010-13510 A | 1/2010 |
| JP | 2011-505816 A | 3/2011 |

(Continued)

OTHER PUBLICATIONS

English translation for JP2013183694 published Sep. 2013.*

(Continued)

*Primary Examiner* — Anthony J Weier
(74) *Attorney, Agent, or Firm* — WHDA, LLP

(57) ABSTRACT

An object of the present invention is to provide a method for producing a tea aroma composition wherein the excellent aroma of tea leaves is enhanced.
In the method for producing a tea aroma composition, tea leaves are treated by steam distillation to collect a distillate and then the obtained distillate is subjected to distillative concentration.

3 Claims, 2 Drawing Sheets

(56) References Cited

FOREIGN PATENT DOCUMENTS

| JP | 2011-92044 A | | 5/2011 |
|---|---|---|---|
| JP | 2013183694 | * | 9/2013 |
| WO | 2009/077189 A1 | | 6/2009 |

OTHER PUBLICATIONS

English Translation for CN104957315 published Oct. 2015.*
Mizukami Y., "Changes in Key Odorants in Sen-cha Caused by Roasting", Chagyo Kenkyu Hokoku, 2015, vol. 119, pp. 13-20, with English abstract, cited in ISR dated Jun. 23, 2020. (9 pages).
International Search Report dated Jun. 23, 2020, issued in counterpart International application No. PCT/JP2020/013896. (2 pages).
Yang et al., "Recent studies of the volatile compounds in tea", Food Research International, 2013, Elsevier, Amsterdam, NL, vol. 53, No. 2, pp. 585-599, cited in Extended (Supplementary) European Search Report dated Nov. 24, 2022. (15 pages).
Extended (Supplementary) European Search Report dated Nov. 24, 2022, issued in counterpart EP Application No. 20783740 2. (8 pages).
Written Opinion dated Jun. 13, 2023, issued in counterpart SG Application No. 11202110240W. (9 pages).

* cited by examiner

METHOD FOR MANUFACTURING TEA AROMA COMPOSITION

TECHNICAL FIELD

The present invention relates to a method for producing a tea aroma composition, and more particularly to a method for producing a tea aroma composition with an enhanced aroma.

BACKGROUND ART

Tea beverages produced from processed tea leaves are widely consumed not only in Japan but also in other countries throughout the world. Some tea beverages are sold in the form of packaged beverages in which tea beverages are sterile packed in packages such as PET bottles or cans, or other tea beverages are sold in the form of tea beverage powders which are made by drying and pulverization and are intended to be dissolved in cold or hot water, etc. before drinking. In recent years, different aromatizing materials have been used in various types of tea beverages for the purpose of further improving the aroma of tea beverages. In particular, there is a strong demand from tea beverage manufacturers to develop an aromatizing material with an enhanced aroma.

It is known that aroma components present in aromatizing materials are generally collected from natural source materials using a steam distillation method. Although sufficiently high concentrations of aroma components can be obtained even by simply performing steam distillation, various methods for producing aromatizing materials have hitherto been reported, with a view to obtaining much higher concentrations of aroma components or to obtaining aroma components more efficiently. For example, there have been disclosures about a technique of collecting an aroma component by subjecting a distillated obtained by steam distillation to gas-liquid countercurrent contact distillation (PTL 1), and about a technique of recovering an aroma component by following the steps of concentrating a vapor during a distillation process, separating an oil phase concentrate from the obtained aqueous phase, and refluxing the substantially oil-free aqueous phase (PTL 2). Also disclosed is a method for producing an aroma concentrate, the method comprising the steps of treating a natural source material by steam distillation, adding water to residues remaining after the steam distillation to collect a liquid extract, mixing the liquid extract with a distillate obtained by the steam distillation, and condensing the mixture using a reverse osmotic membrane (PTL 3).

CITATION LIST

Patent Literatures

PTL 1: Japanese Unexamined Patent Application Publication No. JP 2011-92044
PTL 2: Japanese Translation of PCT International Publication No. JP 2011-505816
PTL 3: Japanese Unexamined Patent Application Publication No. JP 2010-13510

SUMMARY OF INVENTION

Technical Problem

Aroma components present in tea leaves and contributing to excellent aroma are generally easy to volatilize. Thus, aromatizing materials obtained using commonly known conventional techniques including steam distillation are not necessarily fully capable of imparting or maintaining excellent aroma. Therefore, an object of the present invention is to provide a method for producing a tea aroma composition with an enhanced tea leaf aroma.

Solution to Problem

The present inventors have made intensive studies to achieve the aforementioned object and, as a result, found that when an aroma component derived from tea leaves is extracted by steam distillation and the obtained distillate is concentrated by a distillative concentration method, the excellent aroma coming from tea leaves can be effectively enhanced. Based on this finding, the inventors have completed the present invention.

The present invention is directed, but not limited, to the following.
(1) A method for producing a tea aroma composition, the method comprising the steps of: treating tea leaves by steam distillation to collect a distillate: and subjecting the obtained distillate to distillative concentration.
(2) The method as set forth in (1), wherein the distillative concentration is atmospheric distillative concentration or vacuum distillative concentration.
(3) The method as set forth in (1) or (2), wherein the distillative concentration step involves a salting-out treatment.
(4) The method as set forth in any one of (1) to (3), the method further comprising, before the steam distillation step, a step of heating tea leaves.

Advantageous Effects of Invention

According to the present invention, there can be provided a method for producing a tea aroma composition with an enhanced tea leaf aroma. The tea aroma composition obtained by the method of this invention has high potency of imparting the excellent aroma of tea leaves and makes it possible to achieve reduced volume. The tea aroma composition produced according to this invention can be used as a source material for making beverages and can effectively impart the excellent aroma of tea leaves to beverages in general. The tea aroma composition of this invention is particularly effective in imparting the excellent aroma of tea leaves to packaged beverages, i.e., beverages packed in PET bottles, cans or other packages.

Further, the tea aroma composition obtained by the production method of the present invention can be used not only for beverages but also for foods. In recent years, there has been a tendency toward an increase in the number and types of tea flavored foods. By using the method of this invention, the excellent aroma of tea leaves can be effectively imparted to, for example, confectionary foods, such as cakes, sponge cakes, candies, cookies, jellies, and puddings.

DESCRIPTION OF EMBODIMENTS

Figure 1:
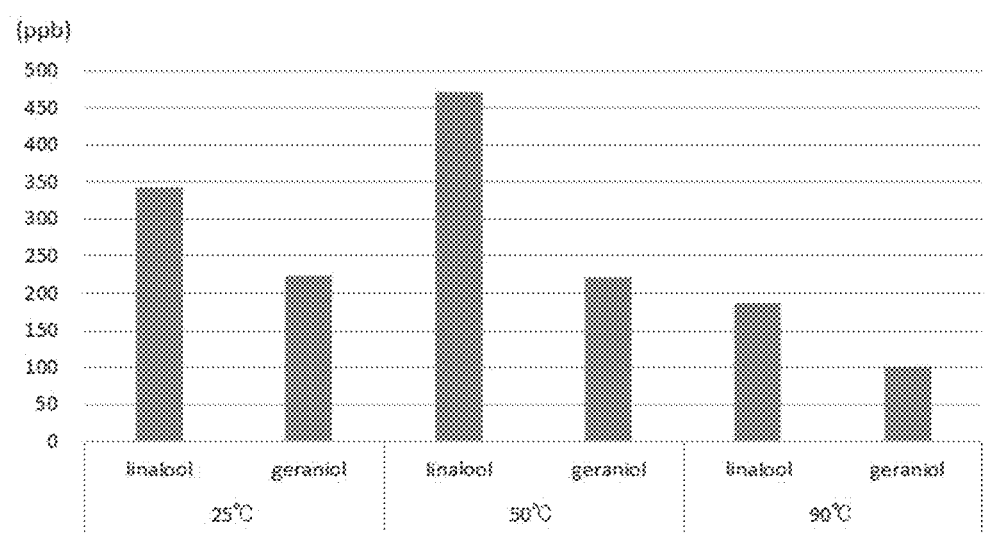
FIG. 1 depicts a diagram showing the concentrations of linalool and geraniol in liquid tea leaf extracts extracted at different temperatures.

Hereunder, the method for producing a tea aroma composition according to the present invention will be described. Unless otherwise specified, the terms "ppm", "ppb" and "wt. %" as used herein refer respectively to ppm, ppb, and wt. % on a weight/volume (w/v) basis.

One embodiment of the present invention is directed to a method for producing a tea aroma composition, the method comprising the steps of: treating tea leaves by steam distillation to collect a distillate; and subjecting the obtained distillate to distillative concentration. By adopting these constituent steps, a tea aroma composition with an enhanced tea leaf aroma can be obtained. As referred to herein, the term "tea aroma composition" refers to a composition comprising an aroma component obtained from tea leaves used as a source material ("tea leaf-derived aroma component"). In this invention, the tea aroma composition is generally used for dilution or dispersion in products of interest, such as beverages and foods, and can impart the aroma derived from tea leaves to the products of interest. Therefore, the tea aroma composition of this invention can also be referred to as a tea aromatizing composition. The form of the tea aroma composition of this invention is not particularly limited, but is generally liquid.

The tea leaves that can be used as a source material in the present invention are leaves obtained from plants belonging to the family Theaceae, genus *Camellia* (e.g., *Camellia sinensis* (L) O. Kuntze). The tea leaves used in this invention can be classified into non-fermented tea leaves, semi-fermented tea leaves, and fermented tea leaves depending on the method of processing. Examples of non-fermented tea leaves include, but are not limited to, green tea leaves, such as Aracha (crude tea), Sencha (brewed green tea), Gyokuro (refined green tea), Kabuse-cha (shaded green tea), Kukicha (twig tea), Tencha (non-ground tea leaves used for Matcha), Bancha (coarse green tea), Houji-cha (roasted green tea), Kamairi-cha (pot-roasted green tea), Kukicha, Bocha (roasted twig tea), and Mecha (bud tea). Examples of semi-fermented tea leaves include, but are not limited to, oolong tea leaves, such as Tieguanyin (Tekkanon), Sezhong (Shikishu), Huangjin Gui (Ougonkei), and Wuyi tea (Buigan tea). Examples of fermented tea leaves include, but are not limited to, black tea leaves, such as Darjeeling, Assam, and Sri Lanka. In this invention, one type of tea leaves may be used alone, or two or more types of tea leaves may be used in a blended form. Any parts of plants, such as leaves and stems, can be used, as appropriate, to make tea without particular limitation as long as they are plant parts from which an aroma component can be extracted. Tea leaves can be used in any shapes, without limitation, such as whole or powdered leaf.

The form of tea leaves used as a source material is not particularly limited, and raw tea leaves or roasted tea leaves can be used. Tea leaves may be processed for use as a source material—for example, they may be heat-treated before steam distillation, or they may be treated in other ways, such as pulverization or moistening. Exemplary methods for moistening tea leaves include soaking tea leaves in water, and spraying water onto tea leaves with an atomizer or the like. When tea leaves are soaked in water, the tea leaves may be stirred in a soaked state. When tea leaves are moistened, water is used, for example without particular limitation, in an amount of from 0.1 to 5 times by weight, preferably from 0.3 to 3 times by weight, more preferably from 0.5 to 2 times by weight, relative to the weight of tea leaves which is taken as 1.

As mentioned above, in the present invention, tea leaves may be heated as a pretreatment before steam distillation. In other words, the method of this invention may comprise a step of heating tea leaves before a steam distillation step.

The heat treatment of tea leaves can be done, for example, while the tea leaves are soaked in water. In the case of soaking tea leaves in water, the tea leaves may be stirred in a soaked state. When tea leaves are soaked in water, water can be used, for example, in an amount of from 0.1 to 20 times by weight, preferably from 1 to 15 times by weight, more preferably from 3 to 10 times by weight, relative to the weight of tea leaves which is taken as 1. The temperature (e.g., water temperature) at which to heat tea leaves can be set to, for example, from 20 to 100° C., preferably from 30 to 80° C., more preferably from 35 to 70° C. The time of heating tea leaves (e.g., the time of soaking tea leaves in water) can be set to, for example, from 10 minutes to 10 hours, preferably from 30 minutes to 6 hours, more preferably from 1 to 4 hours, still more preferably from 1.5 to 3 hours.

In the present invention, tea leaves may be pulverized before steam distillation. Pulverizing tea leaves in advance enhances the concentrations of aroma components obtained. Subjecting pulverized tea leaves to heat treatment, followed by steam distillation, is one of preferred procedures of this invention. The procedure for pulverizing tea leaves is not particularly limited, and pulverization can be done such that the size of pulverized tea leaves is in the range of, for example, from 0.001 to 20 mm, preferably from 0.01 to 10 mm, more preferably from 0.1 to 5 mm.

In the method of the present invention, tea leaves are distilled using a steam distillation method. Steam distillation is a method in which steam is passed through a source material (tea leaves) and aroma components distilled out together with steam are aggregated by cooling, and exemplary modes of steam distillation that can be adopted include atmospheric steam distillation, vacuum steam distillation, and gas-liquid multistage countercurrent contact distillation (spinning cone column). In this invention, atmospheric steam distillation is preferably used. During the process of steam distillation, aroma components are distilled out in large amounts at an early stage of distillation and thereafter the amount of aroma components distilled decreases gradually. The timing of terminating distillation can be determined, as appropriate, depending on the desired amounts of aroma components, economic efficiency or the like. Steam distillation of tea leaves can be performed using a steam distillation apparatus known to skilled artisans.

The type of steam distillation of tea leaves is not particularly limited, and for example, blow-in type steam distillation is performed. The blow-in type steam distillation is a method in which steam is brought into direct contact with a source material (tea leaves) placed in a container such as basket, and the steam passed through the source material is collected and cooled to obtain a distillate. The flow rate of steam used in the blow-in type steam distillation can be set to, for example, from 1 to 40 kg/hr, preferably from 5 to 30 kg/hr, more preferably from 7 to 20 kg/hr. The pressure of steam used in the blow-in type steam distillation is in the range of, for example, from 0.05 to 0.5 MPa, preferably from 0.1 to 0.4 MPa, more preferably from 0.15 to 0.3 MPa, in the mode of atmospheric steam distillation. The distillation temperature used in the blow-in type steam distillation is in the range of, for example, from 70 to 130° C., preferably from 80 to 120° C., more preferably from 90 to 110° C., in the mode of atmospheric steam distillation.

Steam distillation of tea leaves may be performed by a decoction type steam distillation method. The decoction type steam distillation is a method in which a source material (tea leaves) is heated in a state soaked in water and the generated steam is collected and cooled to obtain a distillate.

During the process of decoction type steam distillation, tea leaves as a source material are soaked in water in an amount of, for example, from 0.1 to 20 times by weight, preferably from 1 to 15 times by weight, more preferably from 3 to 10 times by weight, relative to the weight of tea leaves which is taken as 1. The flow rate of steam used in the decoction type steam distillation can be set to, for example, from 5 to 50 kg/hr, preferably from 10 to 40 kg/hr, more preferably from 15 to 30 kg/hr. The pressure of steam used in the decoction type steam distillation is in the range of, for example, from 0.05 to 0.5 MPa, preferably from 0.1 to 0.4 MPa, more preferably from 0.15 to 0.3 MPa, in the mode of atmospheric steam distillation. The distillation temperature used in the decoction type steam distillation is not particularly limited, but is preferably 100° C., in the mode of atmospheric steam distillation.

In the present invention, tea leaves are subjected to steam distillation to collect a distillate. For collecting a fraction, condensation is carried out. The condensation can be performed at a temperature of, for example, not more than 30° C., preferably not more than 25° C., more preferably not more than 20° C. The procedure for the condensation treatment is not particularly limited—for example, the condensation can be performed using a refrigerant for cooling. As the refrigerant, an antifreeze solution or the like can be used. The temperature of the refrigerant can be set to, for example, not more than 20° C., preferably not more than 15° C., more preferably not more than 10° C. The flow rate of the refrigerant used for condensation can be set to, for example, from 10 to 70 L/min., preferably from 15 to 50 L/min., more preferably from 20 to 40 L/min. The time of collecting a distillate can be determined, as appropriate, depending on the intended purpose, but is in the range of, for example, from 5 minutes to 2 hours, preferably from 10 minutes to 1 hour, more preferably from 15 to 45 minutes, after the distillate starts to distill out. In this invention, when a distillate is collected by steam distillation at a weight percentage of, for example, about from 20 to 70% relative to the weight of a source material, a tea aroma composition with a Brix value of less than 1% can be obtained.

In the method of the present invention, the distillate obtained in the aforementioned manner is subjected to distillative concentration. The distillative concentration can be performed by, for example, employing a procedure in which a distillate obtained from tea leaves is placed in a still and boiled by heating from the bottom to collect aroma components distilled out together with steam. For the distillative concentration, an atmospheric distillative concentration method or a vacuum distillative concentration method can be employed. In this invention, the vacuum distillative concentration method is preferably employed. According to the vacuum distillative concentration method, an increase in distillate temperature can be suppressed, thereby preventing thermal decomposition of required aroma components. Distillative concentration of a tea leaf distillate can be performed using a distillator known to skilled artisans.

When distillative concentration of a distillate is performed by a vacuum distillative concentration method, the flow rate of steam can be set to, for example, from 0.1 to 80 kg/hr, preferably from 1 to 60 kg/hr, more preferably from 3 to 40 kg/hr. The pressure of steam used in the vacuum distillative concentration is in the range of, for example, from 0.1 to 0.5 MPa, preferably from 0.15 to 0.4 MPa, more preferably from 0.2 to 0.3 MPa. The distillation temperature used in the vacuum distillative concentration is in the range of, for example, from 10 to 100° C., preferably from 20 to 70° C., more preferably from 35 to 55° C. The degree of pressure reduction employed in the vacuum distillative concentration can be set to, for example, from 0 to −0.101 MPa, preferably from −0.050 to −0.099 MPa, more preferably from −0.075 to −0.095 MPa, as expressed on a gauge pressure basis.

When distillative concentration of a distillate is performed by an atmospheric distillative concentration method, the flow rate of steam can be set to, for example, from 0.1 to 80 kg/hr, preferably from 1 to 60 kg/hr, more preferably from 3 to 40 kg/hr. The pressure of steam used in the atmospheric distillative concentration is in the range of, for example, from 0.1 to 0.5 MPa, preferably from 0.15 to 0.4 MPa, more preferably from 0.2 to 0.3 MPa. The distillation temperature used in the atmospheric distillative concentration is not particularly limited, but is preferably 100° C.

During the process of distillative concentration, like in the process of steam distillation as mentioned above, aroma components are distilled out in large amounts at an early stage of distillation and thereafter the amount of aroma components distilled decreases gradually. The timing of terminating distillation can be determined, as appropriate, depending on the desired amounts of aroma components, economic efficiency or the like. The concentration factor is determined at the time of terminating distillation. The condensation treatment for collecting a fraction distilled at the distillative concentration step can be performed at a temperature of, for example, not more than 30° C., preferably not more than 25° C., more preferably not more than 20° C. Like in the case of the condensation treatment at the steam distillation step as mentioned above, the procedure for the condensation treatment at the distillative concentration step is not particularly limited. For example, the condensation can be performed using a refrigerant for cooling. As the refrigerant, an antifreeze solution or the like can be used. The temperature of the refrigerant can be set to, for example, not more than 20° C., preferably not more than 15° C., more preferably not more than 10° C. The flow rate of the refrigerant used for condensation can be set to, for example, from 10 to 70 L/min., preferably from 15 to 50 L/min., more preferably from 20 to 40 L/min. The time of collecting a distillate at the distillative concentration step can be determined, as appropriate, depending on the intended purpose, but is in the range of, for example, from 2 minutes to 1 hour, preferably from 5 to 45 minutes, more preferably from 10 to 30 minutes, after the distillate starts to distill out. In this invention, by performing the distillative concentration step, a concentrated distillate can be collected at a weight percentage of from 2 to 50% relative to the weight of a distillate before concentration, or namely a concentrated distillate with a concentration factor of about from 2 to 50 times can be obtained. In this invention, the concentrated distillate obtained in the aforementioned manner can be used as a tea aroma composition.

In the present invention, an operation called salting-out may be performed at the step of distillative concentration (preferably, vacuum distillative concentration). By performing the salting-out treatment, water molecules can be attracted by the polarity of a salt in a distillate placed in a still, thereby promoting the vaporization of organic compounds. The salting-out treatment can be performed by incorporating a salt into a distillate to be concentrated. For example, the salting-out can be performed by introducing a salt into a still before or during the distillative concentration treatment, or by adding in advance a salt to a distillate to be concentrated and subjecting the salt-containing distillate to the distillative concentration treatment.

The type of a salt used for salting-out is not particularly limited, and examples thereof include sodium chloride. The amount of a salt used for salting-out is in the range of, for example, from 0.01 to 10 wt. % (w/w), preferably from 0.05 to 6 wt. % (w/w), more preferably from 0.5 to 3 wt. % (w/w), relative to the weight of a distillate before concentration.

The method of the present invention can further comprise a step of treatment with activated carbon. By performing activated carbon treatment, the amounts of unwanted aroma components can be reduced. As referred to herein, the term "activated carbon" refers to a porous, carbon-based substance produced through activation of carbon-containing materials such as wood at high temperatures.

The activated carbon treatment can be performed on a distillate obtained by steam distillation of tea leaves, or on a distillate collected after distillative concentration. In the present invention, it is preferable to perform activated carbon treatment on a distillate obtained by steam distillation of tea leaves (or namely, before the distillative concentration of a distillate).

The shape of activated carbon used is not limited, but powder activated carbon is preferably used in the present invention. The average pore diameter of powder activated carbon is not particularly limited, and is in the range of, for example, from 0.3 to 30 nm, preferably from 0.5 to 20 nm, more preferably from 1 to 15 nm, still more preferably from 1 to 5 nm. The average pore diameter of powder activated carbon can be measured using a specific surface area/pore distribution measurement apparatus known to skilled artisans.

The origin of activated carbon is not particularly limited, and can be selected from, for example, wood-derived activated carbon, coconut husk-derived activated carbon, bamboo-derived activated carbon, rice husk-derived activated carbon, and the like. One type of these activated carbons may be used alone, or two or more types of them may be used in combination. In the present invention, wood-derived activated carbon and coconut husk-derived activated carbon are preferred, with wood-derived activated carbon being particularly preferred.

The procedure for activated carbon treatment is not particularly limited. For example, the treatment with powder activated carbon is performed by following a procedure in which powder activated carbon is added to a distillate to be treated and, after the mixture is left for an appropriate time, the powder activated carbon is removed using a filter or the like. The amount of powder activated carbon added, expressed in terms of relative concentration to the weight of a distillate to be treated, can be set to, for example, from 10 to 1000 ppm (w/w), preferably from 50 to 300 ppm (w/w), more preferably from 75 to 125 ppm (w/w). The time of contact of a distillate with powder activated carbon can be set to, for example, from 1 to 60 minutes, preferably from 3 to 30 minutes, more preferably from 5 to 20 minutes. During the process of contact with powder activated carbon, stirring or other similar operations may be performed. The treatment temperature employed in the activated carbon treatment can be set to, for example, from 1 to 30° C., preferably from 2 to 20° C., more preferably from 3 to 10° C.

The tea aroma composition obtained by the production method of the present invention as described above can be added, as a beverage or food ingredient, to for example beverage products, so that the excellent aroma of tea leaves can be enhanced in the beverage products. For this reason, another embodiment of this invention can provide a method for enhancing or maintaining the excellent aroma of tea leaves in a food or beverage product, the method comprising a step of adding the aforementioned tea aroma composition to the beverage or food product. Still another embodiment of this invention provides a method for producing a food or beverage using the aforementioned tea aroma composition.

EXAMPLES

Hereunder, the present invention will be described by way of working examples, but this invention is not limited to these examples.

1. Studies on the Concentration Treatments of Tea Leaf Distillates Obtained by Steam Distillation 1-1. Preparation of Tea Leaf Distillates by Steam Distillation (a) Green Laver Aroma Distillate Twelve kilograms of commercial Sencha tea leaves were weighed out and moistened by adding 12 kg of water thereto. A total of 24 kg of the moistened tea leaves were placed on a basket in a steam still, and blow-in type steam distillation was performed at a steam pressure of 0.2 MPa and a steam flow rate of 15 kg/hr for 90 minutes. Then, condensation was performed in a condenser containing a brine solution at a temperature of from 3 to 5.5° C. to collect a distillate. The amount of the distillate collected was 21.2 kg. This operation was repeated three times to obtain a total of 63 kg of green laver aroma distillate.

(b) Flower Aroma Distillate

As an example of using a different source material from Sencha tea leaves, 15 kg of commercial Kukicha tea leaves were weighed out and mixed with 100 kg of water, and the mixture was held at 50° C. for 2 hours to effect heat treatment of the tea leaves. Next, the treated solution, while containing tea leaves, was placed in a steam still, and decoction type steam distillation was performed at a steam pressure of 0.2 MPa and a steam flow rate of 20 kg/hr for 30 minutes. Then, condensation was performed in a condenser containing a brine solution at a temperature of from 5.5° C. to collect a distillate. The amount of the distillate collected was 8 kg. This operation was repeated eight times to obtain a total of 64 kg of flower aroma distillate.

1-2. Activated Carbon Treatment of Distillates

The different distillates obtained by steam distillation were treated with activated carbon. To be specific, 2 g of wood-derived powder activated carbon (Shirasagi WP-Z; produced by Osaka Gas Chemicals Co., Ltd.) with an average pore diameter of 3 nm was added to 20 kg of each of the different distillates, and the mixture was stirred at 200 rpm for 10 minutes. Then, the activated carbon was removed from each distillate using a filter paper (ADVANTEC, No. 2).

1-3. Concentration Treatments of Distillates (a) Atmospheric Distillative Concentration Twenty kilograms of each of the aforementioned two distillates treated with activated carbon was placed in a still, and 0.2 kg of sodium chloride (Eco Salt; produced by Miura Co., Ltd.) was further added thereto for salting-out treatment. The contents were heated under atmospheric pressure at a steam flow rate of 15 kg/hr to raise the temperature of each distillate to 100° C. A fraction collected from each distillate by atmospheric distillative concentration was cooled in a condenser containing a brine solution circulated under the conditions of inlet temperature of 3.5° C. and flow rate of 31 L/min. Immediately after it was observed that the distillate started to distill out by atmospheric distillative concentration, the steam flow rate was lowered to 5 kg/hr and then distillation was continued at that flow rate for 20 minutes to collect 1.0 kg of distillate (concentrated to 20-fold).

(b) Vacuum Distillative Concentration

Twenty kilograms of each of the aforementioned two distillates treated with activated carbon was placed in a still, and 0.2 kg of sodium chloride (Eco Salt; produced by Miura Co., Ltd.) was further added thereto for salting-out treatment. Next, the interior of the still was depressurized to −0.09 MPa using a vacuum pump. The depressurized still was heated at a steam flow rate of 15 kg/hr to raise the temperature of each distillate to 40° C. A fraction collected from each distillate by vacuum distillative concentration was cooled in a condenser containing a brine solution circulated under the conditions of inlet temperature of 3.5° C. and flow rate of 31 L/min. Immediately after it was observed that the distillate started to distill out by vacuum distillative concentration, the steam flow rate was lowered to 5 kg/hr and then distillation was continued at that flow rate for 24 minutes to collect 1.0 kg of distillate (concentrated to 20-fold).

(c) Membrane Concentration

Each of the aforementioned two distillates treated with activated carbon was subjected to membrane concentration using a membrane concentration unit (Alfa Laval, LabStak M20) and a reverse osmotic membrane (RO membrane) (NaCl removal efficiency: 99.5%; GE, Flat Sheet AG). To be specific, 20 kg of each of the distillates treated with activated carbon was weighed out and subjected to membrane concentration at an inlet pressure of 2 MPa and a distillate circulation flow rate of 1.4 L/min. while the distillate temperature was maintained at less than 20° C. using a cooling water condenser. The membrane concentration was continued until the amount of distillate collected reached 1 kg (concentrated to 20-fold). It took 99 minutes to concentrate the green laver aroma distillate and 103 minutes to concentrate the flower aroma distillate.

(d) Freeze Concentration

Each of the aforementioned two distillates treated with activated carbon was subjected to freeze concentration. To be specific, 60 mL of each of the distillates treated with activated carbon was weighed out, charged to a vessel, and frozen by standing still at −80° C. for 24 hours. Then, the frozen distillate was freeze dried under the conditions of suction pressure of 0.11 mBar and trap temperature of −88° C., to thereby ensure complete sublimation of ice.

1-4. Sensory Evaluation Test

Ten milliliters of each of the different steam distillate concentrates treated by atmospheric distillative concentration, vacuum distillative concentration or membrane concentration as mentioned above was weighed out and diluted with purified water to a volume of 200 mL, whereby diluted solutions with a dilution factor of 20 times were prepared. 30 g of each of the diluted solutions was weighed out and added to 270 g of a tea beverage to prepare test samples 1 to 3 as shown in the table given below. When using the steam distillate treated by freeze concentration, 60 mL of purified water was added to the frozen concentrate (solid) to prepare a solution of the frozen concentrate. 30 g of the solution was weighed out and added to 270 g of a tea beverage to prepare test sample 4. A tea beverage with no addition of distillate (i.e., a plain tea beverage) and a tea beverage prepared with addition of a distillate treated only with activated carbon (not treated by concentration) were also prepared as control samples 1 and 2, respectively. The tea beverage used in this test was a commercially available tea beverage (Iyemon: produced by Suntory).

TABLE 1

| Sample | | Tea beverage | Amount added | Total sample amount |
|---|---|---|---|---|
| Control sample 1 | No distillate | 300 g | 0 g | 300 g |
| Control sample 2 | No condensation | 270 g | 30 g | 300 g |
| Test sample 1 | Atmospheric steam distillation | 270 g | 30 g | 300 g |
| Test sample 2 | Vacuum steam distillation | 270 g | 30 g | 300 g |
| Test sample 3 | Membrane concentration | 270 g | 30 g | 300 g |
| Test sample 4 | Freeze concentration | 270 g | 30 g | 300 g |

The above-prepared samples were subjected to sensory evaluation by five panelists regarding green laver aroma or flower aroma. In this sensory evaluation, control samples 1 and 2 were rated as 1.0 and 3.0, respectively, regarding the extent (intensity) of feeling the aroma characteristic of a green laver aroma distillate or a flower aroma distillate, and on that basis, test samples 1 to 4 were given a score of from 1.0 to 5.0 (with 0.1 increments). The panelists evaluated control samples 1 and 2 in an open form and test samples 1 to 4 in a closed form. The results are shown in the table given below.

TABLE 2

<Evaluation of green laver aroma>

| Sample | Panelist | | | | | Average |
|---|---|---|---|---|---|---|
| | A | B | C | D | E | |
| Control sample 1 | 1.0 | 1.0 | 1.0 | 1.0 | 1.0 | 1.0 |
| Control sample 2 | 3.0 | 3.0 | 3.0 | 3.0 | 3.0 | 3.0 |
| Test sample 1 | 3.5 | 2.5 | 4.0 | 4.0 | 3.3 | 3.5 |
| Test sample 2 | 3.5 | 3.0 | 3.0 | 4.5 | 3.2 | 3.4 |
| Test sample 3 | 3.0 | 2.0 | 2.5 | 2.0 | 3.0 | 2.5 |
| Test sample 4 | 2.5 | 1.0 | 2.2 | 1.0 | 1.5 | 1.6 |

The panelists offered free comments on aroma characteristics as summarized below. Control sample 2 was felt to have a slight steaming odor, whereas test samples 1 and 2 were not felt to have such a steaming odor. Test sample 3 was felt to have a bitter taste. Test sample 4 was felt to give off a strong potato-like odor and a fishy smell.

TABLE 3

<Evaluation of flower aroma>

| Sample | Panelist | | | | | Average |
|---|---|---|---|---|---|---|
| | A | B | C | D | E | |
| Control sample 1 | 1.0 | 1.0 | 1.0 | 1.0 | 1.0 | 1.0 |
| Control sample 2 | 3.0 | 3.0 | 3.0 | 3.0 | 3.0 | 3.0 |
| Test sample 1 | 3.0 | 2.7 | 2.5 | 2.8 | 3.5 | 2.9 |
| Test sample 2 | 3.0 | 3.0 | 4.0 | 3.5 | 4.5 | 3.6 |
| Test sample 3 | 3.0 | 2.0 | 2.0 | 2.0 | 3.0 | 2.4 |
| Test sample 4 | 1.5 | 1.2 | 1.0 | 1.0 | 1.0 | 1.1 |

The panelists offered free comments on aroma characteristics as summarized below. Control sample 2 was felt to have a slight steaming odor, whereas test samples 1 and 2 were not felt to have such a steaming odor. Test sample 2 was felt to have a more pronounced flower aroma than test sample 1. The flower aroma characteristics of test samples 3 and 4 were considered to be relatively faint.

The above results were comprehensively judged according to the following criteria.

Double circle (◎): The averaged rating is greater than 3.0.
Single circle (○): The averaged rating is greater than 2.5 but not greater than 3.0.
Triangle (Δ): The averaged rating is greater than 2.0 but not greater than 2.5.
Cross (X): The averaged rating is not greater than 2.0.

The judgment results are shown below.

TABLE 4

| Sample | | Green layer aroma | | Flower aroma | |
|---|---|---|---|---|---|
| | | Average | Judgment | Average | Judgment |
| Control sample 1 | No distillate | 1.0 | X | 1.0 | X |
| Control sample 2 | No condensation | 3.0 | ○ | 3.0 | ○ |
| Test sample 1 | Atmospheric steam distillation | 3.5 | ◎ | 2.9 | ○ |
| Test sample 2 | Vacuum steam distillation | 3.4 | ◎ | 3.6 | ◎ |
| Test sample 3 | Membrane concentration | 2.5 | ○ | 2.4 | Δ |
| Test sample 4 | Freeze concentration | 1.6 | X | 1.1 | X |

As shown above, test sample 1 prepared through atmospheric distillative concentration gained better judgment than control sample 2 in terms of green laver aroma. Test sample 2 prepared through vacuum distillative concentration gained better marks than control sample 2 in terms of both green laver aroma and flower aroma. These results revealed that enhancement of tea leaf-derived aroma can be achieved by subjecting a tea leaf distillate obtained by steam distillation to further treatment by distillative concentration, and suggested that the characteristics of tea leaf-derived aroma can be enhanced, regardless of the type of aroma, by subjecting a tea leaf distillate to vacuum distillative concentration. Additionally, since it was generally believed that concentration treatments merely increase the concentrations of aroma components and do not cause significant change in the quality of aroma, it was unexpected that the quality of aroma was actually enhanced through treatment by distillative concentration as mentioned above.

2. Studies on the Heat Treatment of Tea Leaves Before Steam Distillation 2-1. Study on Heating Temperature Fifty grams of commercial Kukicha tea leaves and 500 mL of distilled water were placed in a glass vial, and the content of the sealed vial was extracted at different temperatures of 25° C., 50° C. or 90° C. for 1 hour, whereby liquid tea leaf extracts were collected. The obtained liquid tea leaf extracts were measured for the concentrations of linalool and geraniol by following the procedure described below.

Ten milliliters of each liquid tea leaf extract was placed in a 20 mL glass vial, 3 g of sodium chloride was added thereto, and the vial was introduced into a gas chromatographic analysis system (Flash GC Nose HERACLES II; produced by Alpha M.O.S. Japan K.K.). The concentrations of linalool and geraniol in each liquid extract was measured under the conditions detailed below.

Incubation: 60° C. for 15 min.
Syringe: temperature: 70° C.; cleaning after injection: 90 sec.
Headspace injection: 5000 μL at 250 μL/sec.
Column 1: MXT-5 (slight polarity, 10 m, 180 μm ID, 0.4 μm)
Column 2: MXT-WAX (high polarity, 10 m, 180 μm ID, 0.4 μm)
Carrier gas flow rate: hydrogen 1.6 mL/min.
Flame ionization detector (FID) temperature: 260° C.
Injector temperature: 200° C.
Oven temperature: 40° C. (5 sec.), then raised at 1.5° C./sec. to 250° C. (90 sec.)
Injection time: 125 sec.
Trap temperature: 50° C. for adsorption, 240° C. for desorption
Trap time: 130 sec. for adsorption, 35 sec. for preheating The measured concentrations of linalool and geraniol are as shown in FIG. 1. The results showed that linalool and geraniol were extracted most effectively at a temperature of 50° C.

2-2. Study on Heating Time

Next, 50 g of commercial Kukicha tea leaves and 500 mL of distilled water were placed in a glass vial, and the content of the sealed vial was extracted at a temperature fixed at 50° C. for different periods of time of 20, 60, 120, or 360 minutes, whereby liquid tea leaf extracts were collected. The obtained liquid tea leaf extracts were measured for the concentrations of linalool and geraniol by following the same procedure as described in the previous section.

Figure 2:
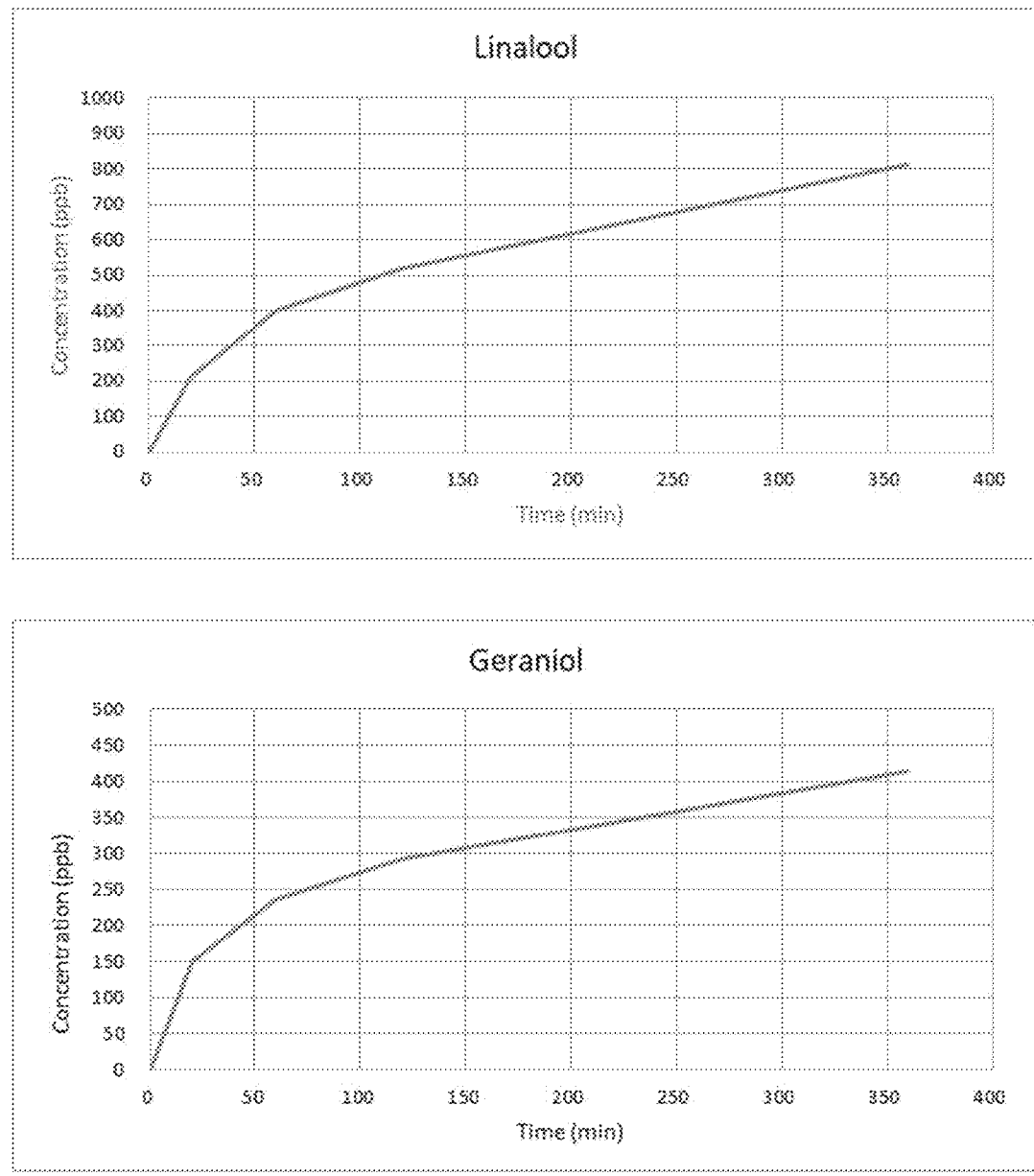
FIG. 2 depicts a diagram showing time-dependent change in the concentrations of linalool and geraniol in a liquid tea leaf extract over different heating times.

The measured concentrations of linalool and geraniol are as shown in FIG. 2. The results showed that the concentrations of both linalool and geraniol extracted continued to increase until the heating time reached 360 minutes. Based on these results, the time of heating tea leaves was set to 120 minutes (2 hours).

2-3. Evaluation of Tea Leaves Treated by Heating

A mixture of 15 kg of commercial Kukicha tea leaves and 100 kg of water was prepared, and a part of the mixture was held at 50° C. for 2 hours for heat treatment of tea leaves, and the remaining part of the mixture was not treated by heating. Each of these mixtures was placed in a steam still and subjected to decoction type steam distillation under the conditions of steam pressure of 0.25 MPa, steam flow rate of 20 kg/hr, and steam temperature of 100° C. (atmospheric). Then, condensation was carried out at cooling refrigerant temperatures of 4° C. for supply and 6° C. for return, and at a refrigerant flow rate of 30 L/min., to collect a distillate. The time of distillate collection was set to 30 minutes after the distillate started to distill out. The amount of the distillate collected was 8 kg. This operation was repeated ten times to obtain a total of 80 kg of distillate.

Each of the distillates collected from the mixture undergoing heat treatment of tea leaves and from the untreated mixture was measured for the concentrations of linalool and geraniol by following the same procedure as described in previous section. As a result, in the distillate from the mixture undergoing heat treatment of tea leaves, the concentrations of linalool and geraniol were 14933 ppb and 12227 ppb, respectively. In contrast, in the distillate from the untreated mixture, the concentrations of linalool and geraniol were 2071 ppb and 1710 ppb. These results suggested that performing heat treatment of tea leaves before steam distillation yields higher concentrations of aroma components.

3. Study on Pulverization of Tea Leaves Before Steam Distillation

Commercial Kukicha tea leaves were pulverized in an electric coffee mill (High Cut Mill, 61005, produced by Kalita Co., Ltd.) (with the dial set to 2).

Next, 100 kg of water at 50° C. was added to 15 kg of the pulverized tea leaves, and the mixture was held for 2 hours while the temperature was kept at around 50° C. Then, the mixed liquid containing tea leaves was transferred to a still and distilled by indirect heating with steam. To be specific, the mixed liquid was subjected to decoction type steam distillation under the conditions of steam pressure of 0.25 MPa, steam flow rate of 20 kg/hr, and steam temperature of 100° C. (atmospheric).

The distillate obtained by steam distillation was further treated with activated carbon. To be specific, wood-derived powder activated carbon (Shirasagi WP-Z; produced by Osaka Gas Chemicals Co., Ltd.) was added to the distillate in an amount of 100 ppm (w/w) relative to the weight of the distillate, and stirring was done at 200 rpm for 10 minutes. Then, the activated carbon was removed from the distillate using a filter paper (ADVANTEC, No. 2).

Different distillate samples were measured for the concentrations of linalool and geraniol by following the same procedure as described in previous section. Additionally, a control sample was also prepared by subjecting a mixed liquid of non-pulverized tea leaves to steam distillation and treating a distillate with activated carbon.

TABLE 5

|  | Linalool | Geraniol |
| --- | --- | --- |
| No pulverization (w/ activated carbon treatment) | 6.57 ppb | 4.26 ppb |
| Pulverization (w/o activated carbon treatment) | 19.27 ppb | 9.52 ppb |
| Pulverization (w/ activated carbon treatment) | 13.16 ppb | 5.55 ppb |

As evident from the above table, it was found that both linalool and geraniol were extracted at higher concentrations from the samples prepared with pulverized tea leaves. These results suggested that pulverizing tea leaves before steam distillation yields higher concentrations of aroma components.

4. Study on Activated Carbon Treatment

Commercial Sencha tea leaves were distilled with steam by following the same procedure as described in previous section to collect a distillate with green laver aroma. To the obtained distillate, any of three different types of powder activated carbons, which differed in type of material and average pore diameter as shown in the table given below, was added to give different concentrations of 10 ppm, 100 ppm or 1000 ppm. After the addition of powder activated carbon, stirring was done at 25° C. for 10 minutes. Then, activated carbon was removed from each distillate using a filter paper (ADVANTEC, No. 2).

TABLE 6

|  | Activated carbon A | Activated carbon B | Activated carbon C |
| --- | --- | --- | --- |
| Material | Coconut busk | Wood powder | Coconut busk |
| Average pore diameter | 2 nm | 3 nm | 1 nm |
| Distribution | 1-5 nm | ≥2-10 nm | ≤3 nm |

The distillates treated with activated carbon were subjected to sensory evaluation in terms of the intensity of feeling green laver aroma and removal of harsh taste. The evaluation results obtained are as shown below.

TABLE 7

|  | Activated carbon A | Activated carbon B | Activated carbon C |
| --- | --- | --- | --- |
| Evaluation result | Significant deterioration of aroma was observed in the distillate treated with 100 ppm of activated carbon. No removal of harsh taste was felt in the distillate treated with 10 ppm of activated carbon. | The stronaest green laver aroma and adequate removal of harsh taste were felt in the distillate treated with 100 ppm of activated carbon. | No removal of harsh taste was felt in the distillate treated with 1000 ppm of activated carbon. |

The above results revealed that the distillates treated with wood-derived powder activated carbon with an average pore diameter of 3 nm were most excellent in terms of both the intensity of feeling green laver aroma and removal of harsh taste.

The invention claimed is:

1. A method for producing a tea aroma composition, the method comprising the steps of:
   heating tea leaves at 30-80° C., wherein the tea leaves are soaked in water;
   treating the heated tea leaves by steam distillation to collect a distillate; and
   subjecting the obtained distillate to distillative concentration.

2. The method according to claim 1, wherein the distillative concentration is atmospheric distillative concentration or vacuum distillative concentration.

3. The method according to claim 1, wherein the distillative concentration step involves a salting-out treatment.

\* \* \* \* \*